United States Patent [19]
Cichy

[11] Patent Number: 5,072,894
[45] Date of Patent: Dec. 17, 1991

[54] APPARATUS AND METHOD FOR INCREASING THE ANGLE OF ATTACK OPERATING RANGE OF AN AIRCRAFT

[75] Inventor: Daniel R. Cichy, Reynoldsburg, Ohio

[73] Assignee: Rockwell International Corporation, El Segundo, Calif.

[21] Appl. No.: 415,676

[22] Filed: Oct. 2, 1989

[51] Int. Cl.$^5$ .............................................. B64C 5/06
[52] U.S. Cl. ........................................ 244/91; 244/49
[58] Field of Search ...................................... 244/91, 49

[56] References Cited

U.S. PATENT DOCUMENTS

| | | | |
|---|---|---|---|
| 2,316,885 | 4/1943 | Ortega | 244/49 |
| 2,925,233 | 2/1960 | Dunn et al. | 244/91 |
| 3,469,807 | 9/1969 | Morris, Jr. | 244/91 |
| 4,247,062 | 1/1981 | Brueckner | 244/91 |
| 4,538,779 | 9/1985 | Goldstein | 244/91 |
| 4,545,552 | 10/1985 | Welles | 244/91 |
| 4,722,499 | 2/1988 | Klug | 244/91 |

FOREIGN PATENT DOCUMENTS

| | | | |
|---|---|---|---|
| 0188998 | 7/1986 | European Pat. Off. | 244/49 |
| 3638347 | 5/1988 | Fed. Rep. of Germany | 244/91 |
| 545359 | 6/1956 | Italy | 244/49 |

*Primary Examiner*—Joseph F. Peters, Jr.
*Assistant Examiner*—Anne E. Bidwell
*Attorney, Agent, or Firm*—Lawrence N. Ginsberg; Charles T. Silberberg

[57] ABSTRACT

An apparatus and method for increasing the angle of attack operating range of an aircraft is disclosed. The invention comprises a pair of substantially vertical tip fins. Each vertical tip fin has a main portion and an aft portion. The main portion is securely connected to the tip of the airplane wing and has a swept back leading edge. The aft portion comprises a substantially vertical aileron hingedly connected to the main portion of the tip fin for controlling the roll of the aircraft at high angles of attack. A hinge line is formed at the hinged connection which is swept back. The sweeping back of the leading edge and the hinge line is such that at high angles of attack the oncoming airflow becomes nearly perpendicular to the leading edge and the hinge line, thereby increasing the performance of the vertical tip fin when deflected.

5 Claims, 2 Drawing Sheets

FIG. 1
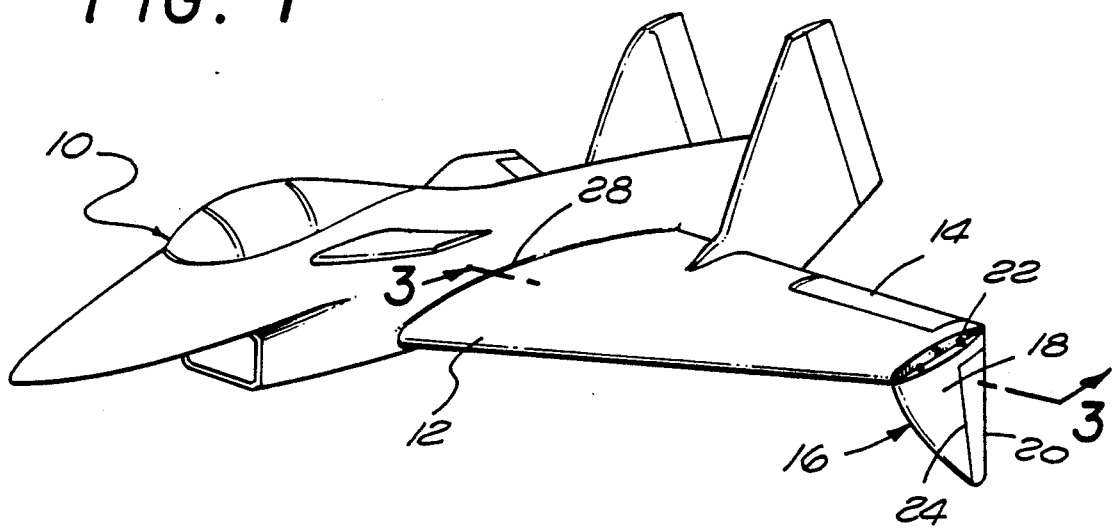
FIG. 2
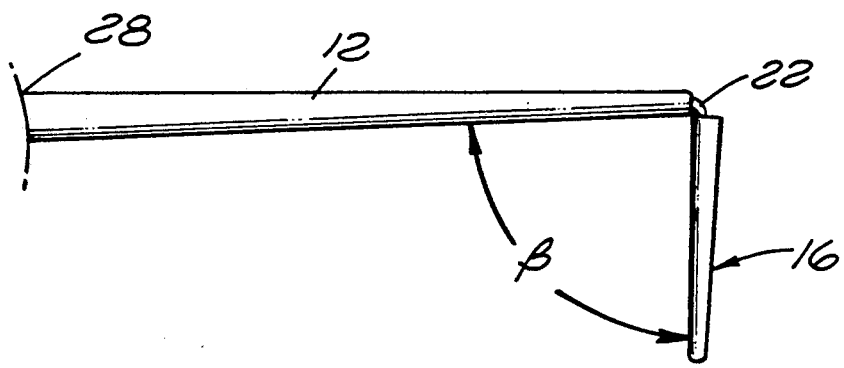
FIG. 3

APPARATUS AND METHOD FOR INCREASING THE ANGLE OF ATTACK OPERATING RANGE OF AN AIRCRAFT

BACKGROUND OF THE INVENTION

1. Field of the Invention

The present invention relates to increasing the performance of aircraft and, more particularly, to an apparatus and method for increasing the angle of attack operating range of an aircraft.

2. Description of the Related Art

When aircraft wings stall due to flow separation, roll control devices such as conventional ailerons or spoilers become ineffective. By increasing the angle of attack operating range over which aircraft aerodynamic roll control surfaces are effective, maneuverability is enhanced, the aircraft can fly slower, and it may utilize shorter runways.

U.S. Pat. No. 3,152,775 issued to J. A. Boyd, entitled "SUPERSONIC AIRCRAFT", discloses movable control surfaces carried by the wing tips for providing roll control for the aircraft. The movable control surfaces are shown in a generally vertical orientation relative to the wing. Thus, although deriving benefits for supersonic aircraft, the Boyd invention would not serve to allow an increase in the angle of attack.

U.S. Pat. No. 4,247,062, issued to H. Brueckner, entitled "HIGH EFFICIENCY VERTICAL TAIL ASSEMBLY COMBINED WITH A VARIABLE WING GEOMETRY", discloses a vertical tail unit combined with a variable wing geometry for large angles of attack. The vertical tail unit is hinged for adjustment about an axis substantially parallel to the longitudinal axis of the fuselage. The outer wing portions are connected, at an angle, with a vertical tail unit which is directed vertically downward in its normal position. The Brueckner, et al. reference does not provide for directional (roll) control.

U.S. Pat. No. 3,025,027, issued to P. F. Ferreira, entitled "VERTICAL AIRFOIL" discloses an aircraft using three vertical airfoils for enhancing lift. The vertical airfoils produce a lifting force the sum of which is located substantially over the center of gravity of the aircraft.

U.S. Pat. No. 3,826,448, issued to S. M. Burk, Jr., entitled "DEPLOYABLE FLEXIBLE VENTRAL FINS FOR USE AS AN EMERGENCY SPIN-RECOVERY DEVICE IN AIRCRAFT", discloses a flexible fin device for mounting to an aircraft to affect spin recovery. The device may be selectively deployed to provide a triangular platform of flexible material to provide spin recovery, and retracted for compact storage during non-use. A single flexible fin may be deflected in a specific direction depending on direction of the spin rotation, or two flexible fins forming an inverted "V" configuration may be used according to the invention. The device is mounted on the underbody of the aircraft.

U.S. Pat. No. 3,845,918 issued to R. P. White, Jr., entitled "VORTEX DISSIPATOR" discloses the use of a fixed plate secured to the tip of an airfoil and aligned with the free stream direction. The plate extends forward from the trailing edge of the tip and outward from the section side of the lifting surface and is configured so that the resultant of the velocity of the free stream flow and the rotational velocity of the vortex produces a stall angle of attack relative to the plate and dissipates much of the strength of the vortex.

U.S. Pat. No. 3,834,654, issued to L. R. Miranda, entitled "BOXPLANE WING AND AIRCRAFT" discloses an aircraft wing system wherein a first pair of rearwardly swept wings is interconnected at the wing tips to a second pair of forwardly swept wings, the interconnection being accomplished by a pair of vertically swept fins. The two pair of wings are horizontally and vertically staggered relative to one another. Each pair of wings is also structurally attached to another aircraft component.

OBJECTS AND SUMMARY OF THE INVENTION

It is therefore a principal object of the invention to increase the angle of attack operating range over which aircraft aerodynamic roll control surfaces can be effective.

The present invention comprises a pair of substantially vertical tip fins. Each vertical tip fin has a main portion and an aft portion. The main portion is securely connected to the tip of the airplane wing and has a swept back leading edge. The aft portion comprises a substantially vertical aileron hingedly connected to the main portion of the tip fin for controlling the roll of the aircraft at high angles of attack. A hinge line is formed at the hinged connection which is swept back. The sweeping back of the leading edge and the hinge line is such that at high angles of attack the oncoming airflow becomes nearly perpendicular to the leading edge and the hinge line, thereby increasing the performance of the vertical tip fin when deflected.

Other objects, advantages and novel features of the present invention will become apparent from the following detailed description of the invention when considered in conjunction with the accompanying drawings.

BRIEF DESCRIPTION OF THE DRAWINGS

FIG. 1 illustrates a perspective view of an aircraft equipped with the apparatus of the present invention.

FIG. 2 illustrates a side view of an aircraft wing equipped with the apparatus of the present invention.

FIG. 3 is a front view of such an aircraft wing taken along line 3—3 of FIG. 1.

The same elements or parts throughout the figures of the drawings are designated by the same reference characters.

DETAILED DESCRIPTION OF THE INVENTION

Figure 4:
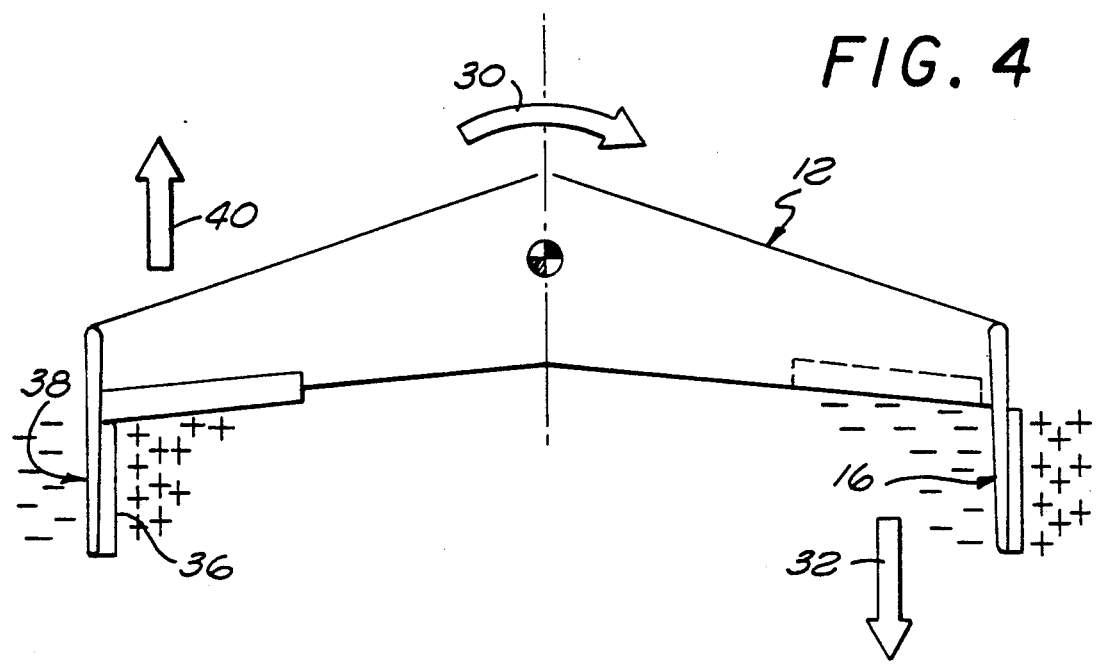
FIG. 4 is a schematic illustration of an aircraft wing equipped with the present invention, shown at a relatively high angle of attack.

Referring now to the drawings and the characters of reference marked thereon, FIG. 1 illustrates an aircraft with a wing 12 and a conventional aileron 14. A tip fin, designated generally as 16 is connected to the outboard portion of the wing 12. The tip fin has a main portion 18 and an aft portion 20. The main portion 18 is securely connected to the wing 12 preferably by an adjustable hinge 22. However, it is within the purview of this invention that the wing 12 be rigidly attached or integral to main portion 18.

The aft portion 20 comprises a substantially vertical aileron connected by a hinge 24 to the main portion 18 of the tip fin 16 for controlling the roll of the aircraft at high angles of attack. The aileron 20 is preferably adjustably pivotable in a range between −30° and +30° of the plane defining the general orientation of the main portion. The vertical aileron preferably defines an area which is in a range between 20% and 60% of the total area of the tip fin. Referring now to FIG. 2, it can be seen that the leading edge 26 is swept back at an angle $\theta$ from an orthogonal of the wing root. The angle at which the leading edge 26 is swept back is in the approximate range of 25° to 50° (from the orthogonal) depending on the design requirements of the particular aircraft such as maximum and minimum speeds, Mach numbers, and angle of attack range. Furthermore, the hinge line 24 of the vertical aileron 20 is swept back at a similar but slightly lower angle (i.e. 15°–45°). As a result of the sweeping back of the leading edge 26 and the hinge line 24, the oncoming airflow becomes nearly perpendicular to these items at the angle of attack where the wing stalls, thereby increasing the performance of the vertical tip fin 16 when deflected.

Referring now to FIG. 3, a front view of the aircraft wing 12 is shown with the tip fin 16 of the present invention. As can be noted by reference to this figure, the tip fin 16 of the present invention is disposed at an angle of $\beta$ at high angles of attack. The angle $\beta$ is defined relative to the wing 12 and is approximately 90°. In this respect, the tip fin 16 is described as being "substantially vertical". As used herein the term "substantially vertical" is defined as an angle $\beta$ in an approximate range between 90° and 120°.

Conventional actuation means may be utilized to orient the tip fin 16 to its correct orientation relative to the wing 12 and similarly, such conventional actuators (not shown) may be used to adjust the vertical aileron 20 relative to the main portion 18 of the tip fin 16.

When the ailerons 14, 20, are deflected, the pressures produced by the vertical aileron 20 on the underside of the wing produce a rolling moment for control. When the wing is at stall or at greater angles of attack, the vertical aileron 20, due to its orientation to the oncoming airflow, cannot stall. This deflected vertical aileron 20 remains effective, while the wing 12 upper surface produces highly separated airflow which makes the normal airleron 14 ineffective.

FIG. 4 illustrates the operation of the present roll control innovation at high angles of attack when the wing flow is separated. A front view of the subject airplane wing 12 is shown while at a relatively high angle of attack. At such a high angle, without the apparatus of the present invention, the wing 12 would be at stall. Generally, this occurs at angles of attack of approximately 15°–30°, depending on the wing shape.

As can be readily seen, at such high angles of attack, a rolling moment may be created in the direction of arrow 30. In such instances, aileron 20 is deflected with its trailing edge directed out. The normal aileron 14 is directed up and away from the trailing edge of vertical aileron 20. Therefore, at a high angle of attack, where deflecting the normal aileron 14 has little effect on the wing pressures, a relative area of low pressure is formed inside tip fin 16 and a relatively high pressure zone is established on the outside of tip fin 16, as shown in this figure. This low pressure also acts on the wing lower surface. Thus, the negative lift results, as illustrated by arrow 32. This negative lift acting on the wing tip produces a rolling moment 30 about the center of the aircraft. On the other hand, on the opposite side of the wing 12, the normal aileron 34 is deflected downward. Furthermore, the trailing edge of the associated vertical aileron 36 is directed toward the center. A region of increased pressure is formed on the inside of tip fin 38 and a region of relatively low pressure is formed on the outside of the tip fin. As a result, a lift is created as shown by the arrow designated 40. This produces a rolling moment contribution that adds to the rolling moment contribution from the other side of the wing to produce a net rolling moment 30.

Figure 5:
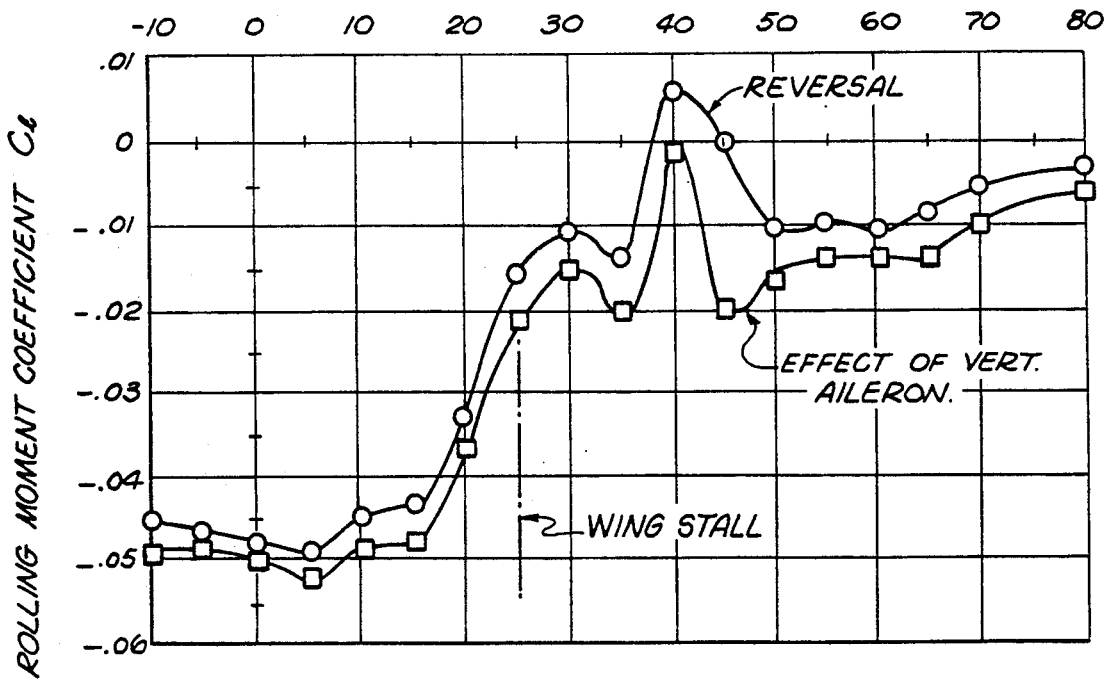
FIG. 5 illustrates test results using the present invention, illustrating the effectiveness of the present invention.

The principles of the present invention have been tested at NASA/Langley on a 0.2 scale model of a Rockwell International Corporation fighter equipped with such a vertical tip fin having a vertical aileron. The test was conducted in the Langley 30'×60' wind tunnel. FIG. 5 presents the data which was derived from these tests which shows the effectiveness of the invention at high angles of attack. The vertical surface comprisres 3.5% of the wing area. The graph shows the rolling movement coefficient, $C_1$ as a function of the angle of attack, $\alpha$. The upper graph shows the aircraft equipped with only conventional normal ailerons, the ailerons, each being deflected at 20° in opposite directions (Right, +20°; left, −20°). The lower curve illustrates use of both conventional ailerons and the vertical ailerons of the present invention. All the ailerons are deflected at ±20° to produce the maximum rolling moment coefficient. Thus, the effect of the vertical ailerons can be seen as the difference in the rolling moment coefficients at a particular angle of attack. The comparison of these curves illustrates that the utilization of such vertical ailerons is most effective between angles of attack of 35° and 50°, even though substantial benefits derive at any angle of attack above stall.

Obviously, many modifications and variations of the present invention are possible in light of the above teachings. Accordingly, it should be understood that, within the scope of the appended claims, the invention may be practiced otherwise than as specifically illustrated and described.

What is claimed and desired to be secured by Letters Patent of the United States is:

1. An apparatus for increasing the angle of attack operating range of an aircraft, comprising:

a pair of substantially vertical tip fins, each having a main portion and an aft portion, said main portion securely connected to the tip of the aircraft wing and having a swept back leading edge, each leading edge of each said tip fins being swept back in an approximate range between 25° and 50° from a line perpendicular to the surface of said airplane wing, said aft portion comprising a substantially vertical aileron hingedly connected to said main portion of the tip fin for controlling the roll of said aircraft at high angles of attack, a hinge line being formed at said hinged connection being swept back, the sweeping back of said leading edge and said hinge line being such that at high angles of attack the oncoming airflow becomes nearly perpendicular to said leading edge and said hinge line thereby increasing the performance of the vertical tip fin when deflected.

2. The apparatus of claim 1, wherein each of said hinge lines is swept back in a range between 15° and 45° of said line perpendicular to the surface of said airplane wing.

3. The apparatus of claim 1, wherein said vertical tip fin is adjustably pivotable about said tip of the airplane wing in a range between 90° and 120° from a plane defining the surface of the airplane wing.

4. The apparatus of claim 3, wherein said vertical aileron is adjustably pivotable about said main portion in a range between −30° and +30° of the plane defining the general orientation of said main portion.

5. The apparatus of claim 1, wherein said vertical aileron defines an area which is in a range between 20% and 60% of the total area of said tip fin.

* * * * *